(12) United States Patent
Hotta et al.

(10) Patent No.: US 8,075,050 B2
(45) Date of Patent: Dec. 13, 2011

(54) SUNROOF SYSTEM

(75) Inventors: Kouichi Hotta, Sakura (JP); Ayumi Mihashi, Sakura (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 2 days.

(21) Appl. No.: 12/652,770

(22) Filed: Jan. 6, 2010

(65) Prior Publication Data

US 2010/0181805 A1 Jul. 22, 2010

(30) Foreign Application Priority Data

Jan. 16, 2009 (JP) .................................. 2009-008011
Jul. 30, 2009 (JP) .................................. 2009-178052

(51) Int. Cl.
  *B60J 7/057* (2006.01)
(52) U.S. Cl. .................................. 296/223; 296/216.08
(58) Field of Classification Search ...... 296/216.01–224
See application file for complete search history.

(56) References Cited

U.S. PATENT DOCUMENTS 4,332,416 A * 6/1982 Lutz et al. ..................... 296/213
6,582,014 B1 * 6/2003 Racine et al. ................. 296/223

FOREIGN PATENT DOCUMENTS

| DE | 19746545 | * | 5/1999 |
| JP | 50-27511 | | 3/1975 |
| JP | 8207590 | A | 8/1996 |
| JP | 2001301466 | A | 10/2001 |
| JP | 2004058782 | A | 2/2004 |
| JP | 2006168531 | A | 6/2006 |

* cited by examiner

*Primary Examiner* — Dennis Pedder
(74) *Attorney, Agent, or Firm* — Marshall & Melhorn, LLC

(57) ABSTRACT

In a sunroof system (3) for a vehicle using a push-pull cable (22) for actuating a sunroof panel (4), the push-pull cable is received in a drive pipe (25), and a sunroof frame (12) is provided with a drive pipe retaining feature (16, 18). Therefore, the drive pipe may be made of flexible material, and firmly held in place by the pipe retaining feature even when the push-pull cable is subjected to significant tensile and compressive load. The pipe retaining feature may include a pipe retaining groove (16) for receiving the drive pipe and clips (18) for resiliently retaining the drive pipes in the pipe retaining groove.

4 Claims, 4 Drawing Sheets

SUNROOF SYSTEM

BACKGROUND OF THE INVENTION

The present invention relates to a drive system for a closure member configured to selectively close an opening of a vehicle roof, and in particular to an automotive sunroof system.

In a typical automotive sunroof system, a pair of side frames each fitted with a guide rail extend in a fore-and-aft direction on either side of a roof opening. Each side frame has a front end adjacent to a front edge of the roof opening and a rear end extending further rearward from a rear edge of the roof opening. A pair of sliders supporting a slide panel are slidably supported by the corresponding guide rails, and to each slider is connected an end of a Bowden or push-pull cable which is configured to be pushed and pulled as required by an electric motor located centrally in a front frame extending along the front edge of the roof opening. Thereby, the slide panel can be moved in a fore-and-aft direction between a closed position fully closing the roof opening and an open position fully exposing the roof opening.

The push-pull cable typically comprises an inner wire including a steel core wire and an additional outer wire wrapped spirally around the core wire, and, optionally, a sheath pipe or a housing that slidably receives the inner wire. The push-pull cable is normally held in position to the corresponding side frame by using cable guides integrally formed in the side frame, and extends substantially linearly along the length of the side frame. A relatively rigid drive pipe made of steel extends from the front end of each side from to a drive gear of the electric motor, and an idle pipe extends from the drive gear away from the drive pipe so that the section of the push-pull cable extending from the front end of the side panel past the drive gear of the electric motor may be guided without any significant deflection in spite of the significant tension and compression that is required to be transmitted by the push-pull cable.

Such a drive pipe and idle pipe are required to be bent in a complex configuration, and this contributed to an increase in the cost of the sunroof system. Japanese patent No. 3043589 (patent document 1) discloses an automotive sunroof system including a pair of drive pipes that are disposed on a common plane and a pair of idle pipes that are made of relatively flexible plastic material. Thereby, the work required for bending the drive pipes can be simplified, and the generation of noises due to the collision between the drive pipes and idle pipes that can be caused by the vibrations of the vehicle can be avoided.

Japanese patent No. 3994815 (patent document 2) discloses an automotive sunroof system in which a front frame made of plastic material is integrally molded with guide pipe portions for receiving the push-pull cable therein. This prior invention allows the number of component parts to be reduced.

According to the invention disclosed in patent document 1, the drive pipes are made of steel, and the need for bending steel pipes prevents the reduction in the manufacturing cost and weight. Because each drive pipe is required to protrude ahead of the front frame for the purpose of avoiding a sharp bending of the drive pipe, the protruding parts of the drive pipes are prone to inadvertent deformation during the handling of the sunroof assembly, and any deformation of the drive pipes may ruin the whole drive system of a sunroof system.

In the case of the sunroof system disclosed in patent document 2, the number of component parts can be reduced owing to the elimination of the drive pipes, but a highly complex die assembly is required for molding the front frame, and this increases the manufacturing cost. Furthermore, because the guide pipe portions cannot be molded so as to entirely surround the push-pull cables, a measure is required to prevent grease from dripping from the guide pipe portions. It is also difficult to entirely eliminate noises that are caused by the sliding contact between the cable and guide pipe portions.

The guide pipe portions are typically given with a highly complex configuration, and this tends to cause poor dimensional and geometrical precision. If there are burrs in the guide pipe portions, the sliding engagement between the burrs and cables cause noises.

BRIEF SUMMARY OF THE INVENTION

In view of such problems of the prior art, a primary object of the present invention is to provide a sunroof system in which a push-pull cable is smoothly guided by a guide pipe (drive pipe and/or idle pipe) while eliminating the need for precise bending work for the guide pipe.

A second object of the present invention is to provide a sunroof system which allows a push-pull cable and guide pipe to be assembled to a frame with ease.

A third object of the present invention is to provide a sunroof system which is protected from inadvertent deformation of the guide pipe.

A fourth object of the present invention is to provide a sunroof system provided with a plastic frame which is easy to mold.

According to the present invention, such an object can be accomplished by providing a sunroof system for selectively closing an opening formed in a roof of a vehicle, comprising: a pair of side frames attached to the roof of the vehicle and extending on either side of the opening in a first direction; a cross frame extending between the side frames; a slider slidably engaged by each side frame for sliding movement in the first direction and supporting a part of a closure member configured to close the opening formed in the roof; a push-pull cable formed with a driven gear along a length thereof and having one end connected to each slider; a drive gear rotatably supported by the cross frame and meshing with the driven gear of the push-pull cable; a drive pipe extending at least along a length of the cross frame and receiving a corresponding part of the push-pull cable therein; wherein the drive pipe is made of plastic material and the cross frame is provided with a pipe retaining feature therein.

Because the drive pipe is made of plastic material, the drive pipe may be readily conformed to the required shape, and has an additional advantage of being light weight. As opposed to the conventional steel or other metal drive pipe, the plastic drive pipe does not require precise bending work so that the manufacturing cost can be reduced. In particular, because the drive pipe can be retained by the cross frame in a desired configuration by using the pipe retaining feature, the assembly work can be simplified.

The plastic drive pipe provides an additional advantage of reducing noises that may be caused by the friction between the drive pipe and push-pull cable. Even though the push-pull cable is subjected to a significant compressive and tensile load, the drive pipe combined with the pipe retaining feature effectively prevents the deflection of the push-pull cable, and this contributes to the reliable operation of the actuating mechanism. Because the drive pipe can be freely bent and kept in position by the pipe retaining feature, the drive pipe can be easily confined within the profile of the cross frame, and is protected from external forces during the handling thereof. Also, the plastic drive pipe is highly resilient, and resistant to permanent deformation.

The pipe retaining feature typically comprises a pipe retaining groove formed along a length of the cross frame. Preferably, the cross frame comprises a main planar section formed by a wall extending substantially horizontally, and the pipe retaining groove is given with such a depth that at least part of the drive pipe retained in the pipe retaining groove overlaps with the horizontal wall of the main planar section.

Thereby, the load acting upon the drive pipe is directly transmitted to the horizontal wall of the main planar section along the major plane thereof so that the load acting on the drive pipe can be effectively supported, and the deflection of the push-pull cable can be positively prevented. This also minimizes the required rigidity of the cross frame.

According to a preferred embodiment of the present invention, the side frames extend in a fore-and-aft direction of a vehicle body, and the cross frame comprises a front frame extending along a front edge of the opening between front ends of the side frames.

According to another embodiment of the present invention, the side frames extend in a fore-and-aft direction of a vehicle body, and the cross frame comprises a rear frame extending along a rear edge of the opening between rear ends or intermediate parts of the side frames.

According to a particularly preferred embodiment of the present invention, the pipe retaining feature comprises a plurality of clips arranged along a length of the pipe retaining groove, each configured to resiliently engage the drive pipe in the pipe retaining groove. The resilient clips simplifies the assembly of the drive pipe, and allows the drive pipe to be removed from the pipe retaining groove when required while the drive pipe can be firmly held in position when in use.

If the pipe retaining groove at least partly comprises a bottom wall while parts of the pipe retaining groove corresponding to the clips are provided with an open bottom end, the cross frame can be molded from plastic material without requiring any complex die assembly. The use of molded plastic material for the cross frame reduces the manufacturing cost, and the weight of the sunroof system.

BRIEF DESCRIPTION OF THE DRAWINGS

Now the present invention is described in the following with reference to the appended drawings, in which.

DETAILED DESCRIPTION OF THE INVENTION

Figure 1:
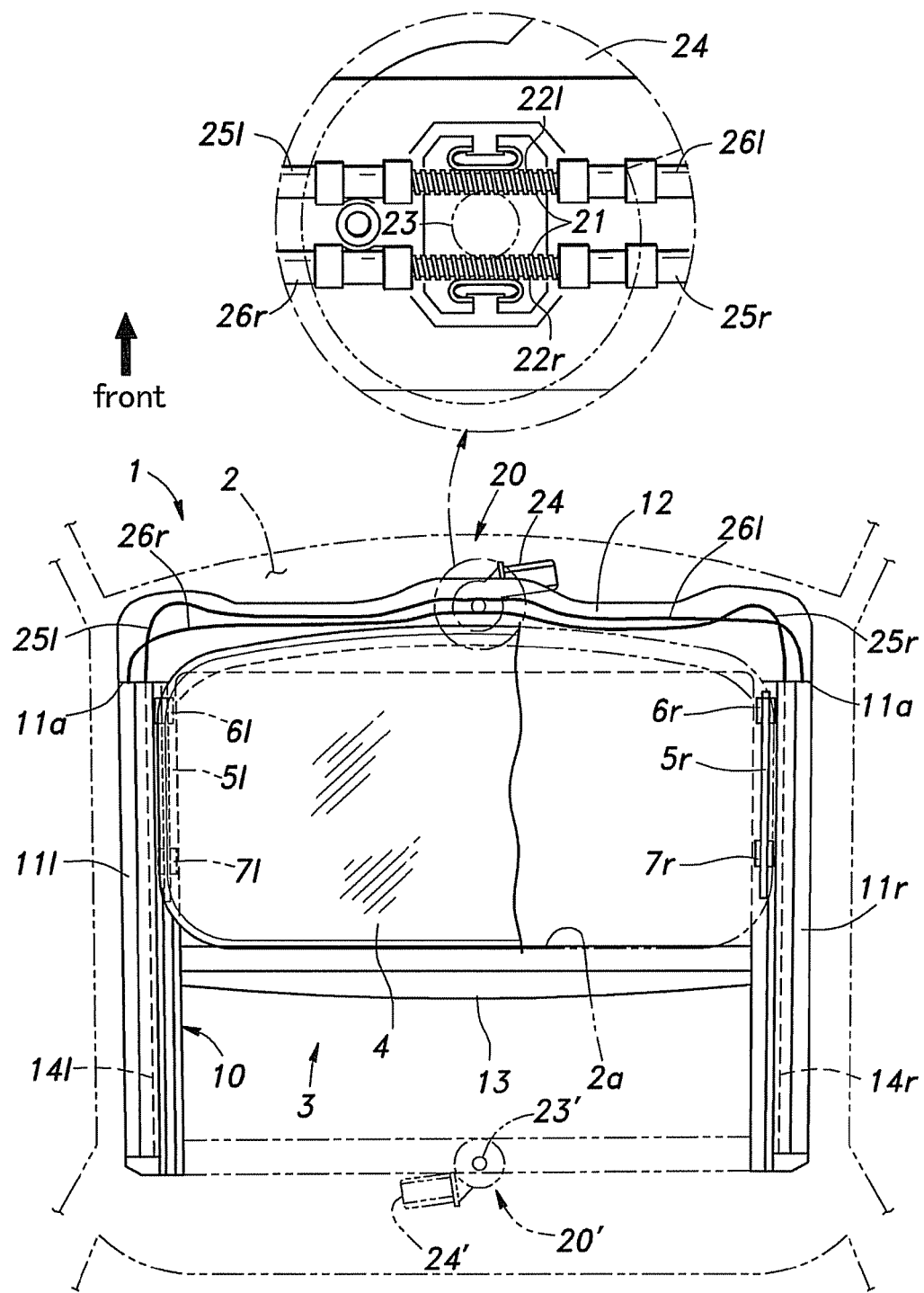
FIG. 1 is a simplified plan view of a sunroof system embodying the present invention.

FIG. 1 generally shows a roof of an automobile incorporated with an automotive sunroof system 3 embodying the present invention. In the following description, numerals denoting some of the parts of the sunroof system 3 may be accompanied by a suffix "l" or "r" to indicate that the particular components are located on which side of the vehicle body, and such parts may be collectively denoted with the corresponding numerals without the suffix.

Referring to FIG. 1, the roof 1 of the automobile comprises a roof panel 2 having a rectangular opening 2a formed in a front part thereof and a sunroof system 3 configured to selectively close the opening 2a. The sunroof system 3 comprises a sunroof panel (closure member) 4 configured to slide in a fore-and-aft direction and tilt up and down to open and close the opening 2a in a per se known manner, a sunroof frame 10 attached to the part of the roof 1 surrounding the opening 2a and an actuator 20 for actuating the sunroof panel 4.

The sunroof frame 10 comprises a pair of side frames 11 (11l and 11r) extending in the fore-and-aft direction on either lateral side of the opening 2a, a front frame 12 extending along the front edge of the opening 2a and joining the front ends of the side frames 11 and a center frame 13 extending along the rear edge of the opening 2a and joining intermediate parts of the side frames 11. Each side frame 11 is formed with a cable guide 14 for guiding a push-pull cable 22 as will be described hereinafter.

A pair of panel brackets 5l and 5r are attached to a lower surface of the sunroof panel 4 and extend along either side edge thereof in the fore-and-aft direction. Each panel bracket 5 is slidably supported by the corresponding side frame 11 (or a guide rail incorporated in the side frame and not shown in the drawings) via a front slider 6 and a rear slider 7. Each rear slider 7 is connected to the panel bracket 5 via a cam and link mechanism so that a rear part of the sunroof panel 4 may be guided not only for a fore-and-aft movement but also for a vertical movement that is required for the tilting movement of the sunroof panel 4.

The actuator 20 comprises a pair of push-pull cables 22 each made of a flexible steel core wire and a spirally wound steel wire wrapped around the core wire so as to form a rack gear extending along the length of the cable. This rack gear serves as a driven gear 21 which meshes with a corresponding drive gear 23 rotatably supported by the front frame 12 via a shaft extending vertically upwardly or downwardly and rotatively actuated by an electric motor 24 via a reduction gear unit not shown in the drawings. Each push-pull cable 22 is guided by a cable guide 14 provided on the corresponding side frame 11 and extends linearly. The part of each cable 22 extending from a front end of the side frame 11 to the drive gear 23 is guided by a drive pipe 25 which is fixedly attached to the front frame 12.

Figure 2:
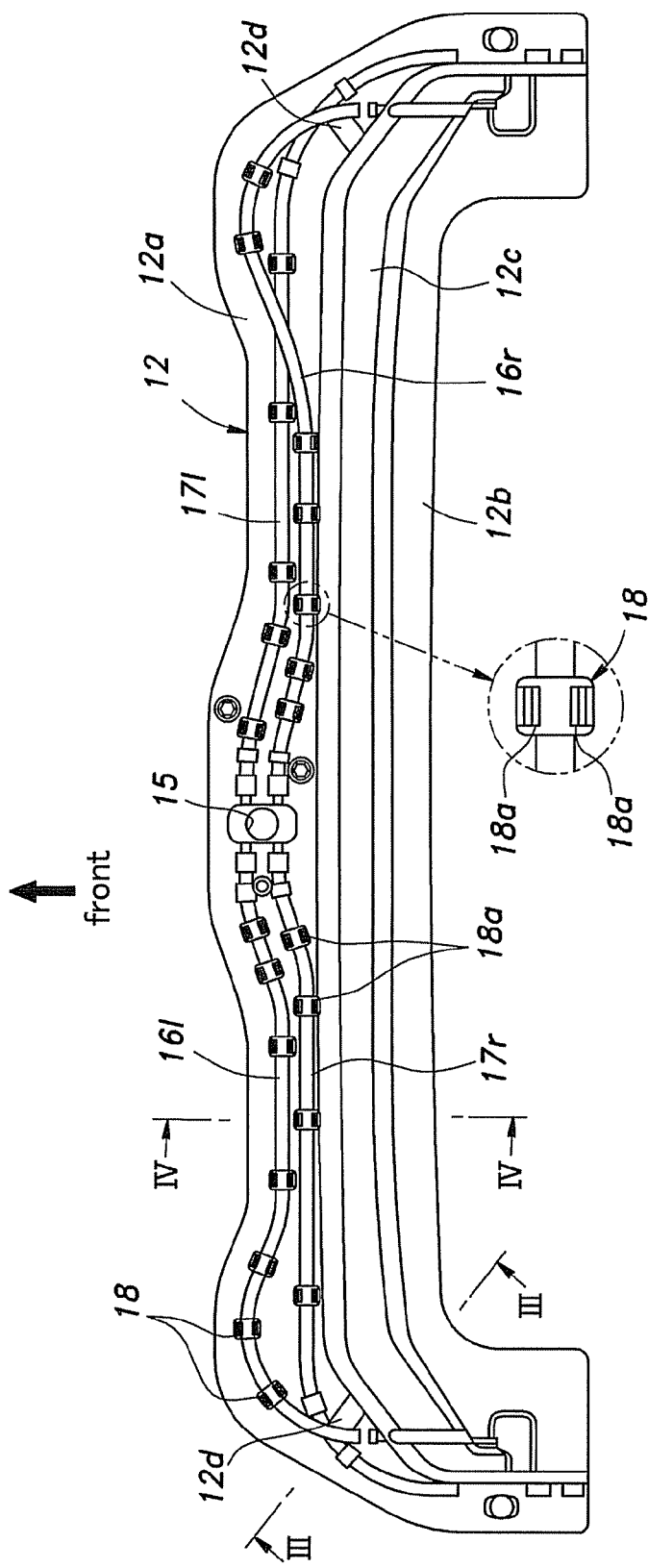
FIG. 2 is a plan view of a front frame of the sunroof system.

The part of each cable 22 extending beyond the drive gear 23 is guided by an idle pipe 26 also fixedly attached to the front frame 12. These guide pipes (drive pipes 25 and idle pipes 26) not only protect the push-pull cable 22 from dust and moisture but also restrict the deflection of the cable 22 when the cable 22 is being pushed and pulled so that the rear sliders 7 may be displaced in precise correspondence with the rotation of the drive gear 23. The two push-pull cables 22 extend in parallel to each other in the parts thereof meshing with the drive gear 23 so that the displacement of the rear sliders 7 may be accurately synchronized with the rotation of the drive gear 23. In FIGS. 1 and 2, the idle pipe 27r connected to the right slider 7r has the suffix "r" and is called as the "right" idle pipe even though it is located on the left hand side of the vehicle roof. The same is true with the "left" idle pipe 27l with an appropriate commutation.

In the illustrated embodiment, the left drive pipe 25l crosses the right idle pipe 26r only once as the left drive pipe 25l extends from the electric motor 24 to the front end of the left side frame 11l as seen in plan view. On the other hand, the right drive pipe 25r crosses the left idle pipe 26l twice as the left drive pipe 25l extends from the electric motor 24 to the front end of the right side frame 11r as seen in plan view. Thereby, the drive pipe, in particular the right drive pipe 25r is allowed to extend to from the electric motor 24 to the right slider 7r guided along the right side frame 11r without being sharply bent and, at the same time, without protruding excessively in the fore-and-aft direction. It is important that the drive pipe extends into the front end of the side frame in the fore-and-aft direction and minimize curvature as much as possible so as to avoid under stress to the push-pull cable 22 and the drive pipe 25. It is also important to confine the fore-and-aft extent of the drive pipe 25 so that the required space for the sunroof system may be minimized.

When fully closed, the sunroof panel 4 presents an upper surface flush with the adjacent part of the roof panel 2. As the electric motor 24 actuates the drive gear 23 to pull the push-pull cables 22, the cam mechanisms incorporated with the rear sliders 7 raises the rear end of the sun roof panel 4 upward, and thereby tilts up the sun roof panel 4. When the cables 22 are pushed from this state, the sunroof panel 4 tilts down. When the cables 22 are pushed further from this state, the rear sliders 7 along with the sunroof panel 4 move rearward, and thereby full open the opening 2a in the roof panel 2.

Figure 3:
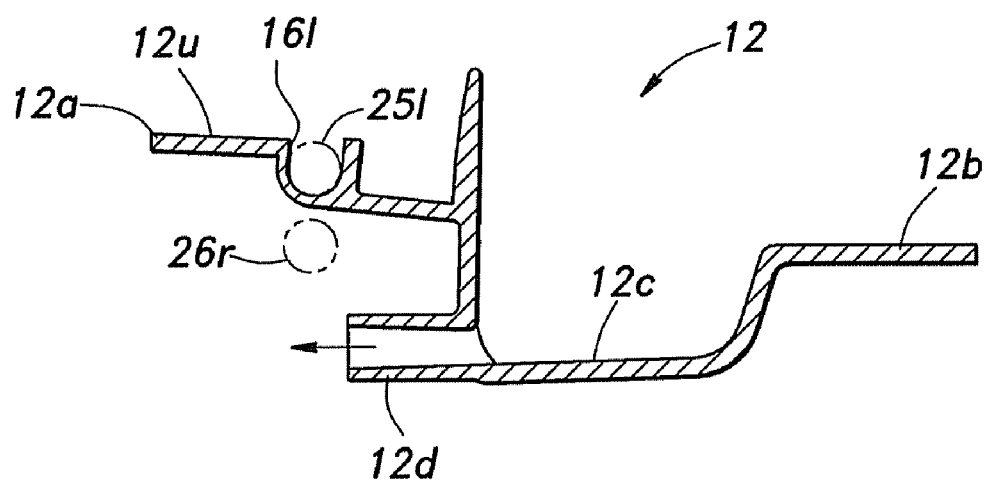
FIG. 3 is a sectional view taken along line III-III of FIG. 2.
Figure 4:
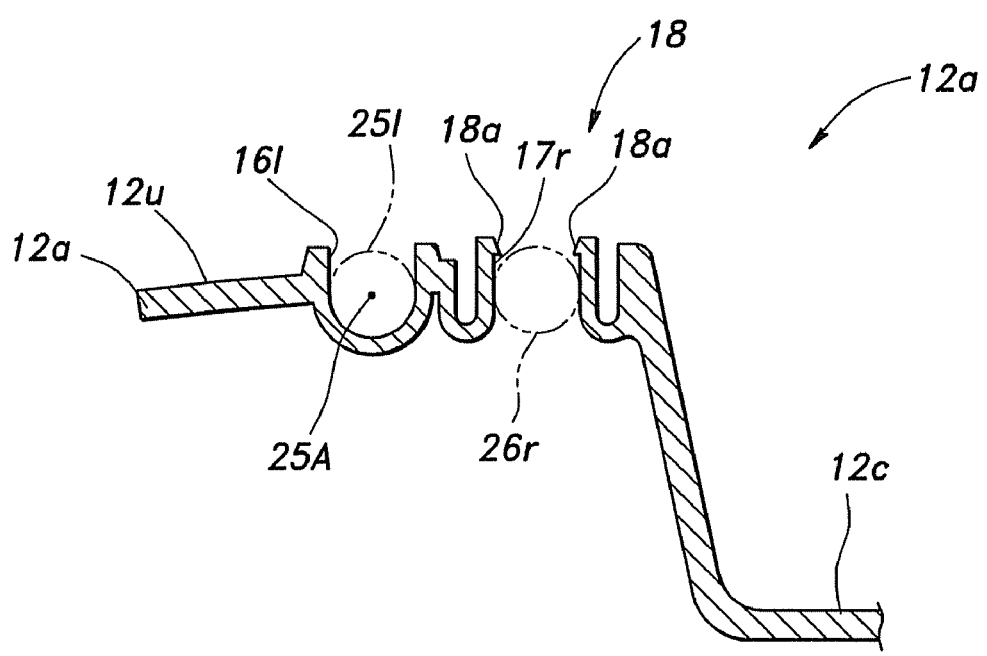
FIG. 4 is an enlarged fragmentary sectional view taken along line IV-IV of FIG. 2.

The arrangement for mounting the drive pipes 25 and idle pipes 26 to the front frame 12 is described in the following with reference to FIGS. 2 to 4. FIG. 2 is a plan view of the front frame 12, FIG. 3 is a sectional view taken along line III-III of FIG. 2, and FIG. 4 is an enlarged sectional view taken along line IV-IV of FIG. 2. As best shown in FIG. 2, the front frame 12 essentially consists of an injection molded planar member having the shape of letter C in plan view, and comprises a front planar section 12a extending substantially horizontally or in parallel with the roof panel 2 and defining a front edge of the front frame 12 when attached to the roof panel 2, a rear planar section 12b extending substantially horizontally at a slightly lower level than the front planar section 12a defining a rear edge of the front frame 12 and a middle recess 12c disposed between the front planar section 12a and rear planar section 12b so as to define a laterally extending water drain groove.

In a laterally middle part of the front planar section 12a is formed an opening 15 for passing the drive gear 23 or the shaft thereof from below or above depending on how the electric motor 24 is mounted on the front frame 12, and a pair of pipe retaining grooves (drive pipe retaining groove 16 and idle pipe retaining groove 17) extend laterally, to the front and rear of the drive gear 23, in a mutually parallel relationship. Of the pipe retaining grooves, the drive pipe retaining groove 16l for retaining a drive pipe 25l for the left push-pull cable 22l and the idle pipe retaining groove 17l for retaining an idle pipe 26l for the left push-pull cable 22l pass along the front side of the opening 15. The drive pipe retaining groove 16r for retaining a drive pipe 25r for the right push-pull cable 22r and the idle pipe retaining groove 17r for retaining an idle pipe 26r for the right push-pull cable 22r pass along the rear side of the opening 15.

The drive pipe retaining grooves 16 extend halfway across the lateral width of the front planar section 12a at a substantially same elevation as the wall thereof, and have an upper side which is substantially entirely open. The idle pipe retaining grooves 17 likewise extend halfway across the lateral width of the front planar section 12a, on the opposite lateral side, at a substantially same elevation as the wall thereof, and have an upper side which is substantially entirely open. As best shown in FIG. 3, at each lateral side end of the front planar section 12a, the corresponding idle pipe retaining groove 17 is gradually curved downward so that the corresponding idle pipe 26 is allowed to cross and pass under the corresponding drive pipe retaining groove 16.

The front frame 12 is integrally molded with a pair of drain pipes 12d which communicate with a lower part of the middle recess 12c and pass under the corresponding drive pipes 25 and idle pipes 26. The outer end of each drain pipe 12 may be connected to a rubber hose or the like not shown in the drawings to conduct the water drained from the middle recess 12c to the outside via the hollow interior of an A pillar or the like.

As shown in FIGS. 2 and 4, the two side walls of each pipe retaining groove (drive pipe retaining groove 16 and idle pipe retaining groove 17) retain the corresponding drive pipe 25 or idle pipe 26, and a plurality of clips 18 are provided at a regular interval along the length of the pipe retaining groove to resiliently engage the corresponding drive pipe 25 or idle pipe 26, each clip 18 being provided with a barb 18a at a free end thereof so that the corresponding pipe may be forced into the pipe retaining groove from above (from the side of the upper surface 12u of the front frame 12). The part of the pipe retaining groove 16, 17 provided with each opposing pair of clips 18 has an open underside while the remaining part of the pipe retaining groove 16, 17 is provided with a bottom wall that supports the lower side of the drive pipe 17 or idle pipe 25, as the case may be. Therefore, the pipe retaining grooves 16 and 17 can be integrally molded with the front frame member 12 without unduly complicating the structure of the molding die assembly.

Each drive pipe 25 or idle pipe 26 is provided with an adequate flexibility to conform to the shape of the pipe retaining groove 16, 17. Thus, the work involved in mounting the drive pipe 25 or idle pipe 26 is simplified but the pipe is securely retained therein once the pipe is fitted into the groove and clips. The removal of the drive pipe 25 or idle pipe 26 is similarly simplified as it can be effected simply by pulling the pipe out of the groove against the resilient force of the clips 19.

As shown in FIG. 4, each drive pipe retaining groove 16 is given with a depth such that the axial center 25A of the drive pipe 25 overlaps with the thickness of the front planar section 12a. Therefore, the load caused by the cable and acting on the drive pipe 25 is directly transmitted to the main body of the front planar section 12a, and the direction of the application of the load is directed along the major plane of the front planar section 12a so that the load is efficiently supported by the front frame 12, and the deflection of the drive pipe 25 can be positively prevented. The drive pipe 25 is not required to have the depth as discussed above over the entire length thereof, but may have the depth over a significant part of the entire length thereof. Also, the depth of each drive pipe 25 may be such that a part of the drive pipe 25, instead of the axial center of the drive pipe 25, overlaps with the thickness of the front planar section 12a as illustrated in FIG. 3.

In the illustrated embodiment, the drive pipes 25 and idle pipes 26 are made of light plastic material so that the weight of the sunroof system 3 may be minimized. Because the drive pipes 25 and idle pipes 26 can be relatively freely bent without requiring any tool, the need for a precise forming process of the pipes is eliminated, and the drive pipes 25 and idle pipes 26 can be mounted on the front frame 12 simply by fitting them into the corresponding pipe retaining grooves 16 and 17. When the electric motor 24 is actuated, and these pipes are subjected to a load from the push-pull cables 22, because the pipes are firmly retained by the drive pipe retaining grooves 16, the deflection of the push-pull cable 22 can be effectively prevented.

In the foregoing embodiment, the electric motor 24 and drive gear 23 were located on the front frame 12. However, it is also possible to place the electric motor 24' and drive gear 23' to the rear of the roof opening as indicated by the imaginary lines in FIG. 1 without departing from the spirit of the present invention. They may be mounted on a rear frame that extends across the rear ends of the side frames 11 (as indicated by the imaginary lines in FIG. 1) or on the center frame 13 (although not shown in the drawings).

Although the present invention has been described in terms of a preferred embodiment thereof, it is obvious to a person skilled in the art that various alterations and modifications are possible without departing from the scope of the present invention which is set forth in the appended claims. For instance, the sunroof system of the illustrated embodiment was configured to effect both a sliding movement and tiling movement of the sunroof panel, but may also be configured to effect only one of the movements without departing from the spirit of the present invention. The electric motor and drive gear were installed in the front frame in the illustrated embodiment, but may also be mounted on a rear frame which may extend between rear ends or intermediate parts of the side frames. The sunroof may also be replaced with a sunshade. The kind of the push-pull cable is not limited to the one used in the illustrated embodiment, but may be freely selected from other forms of push-pull cables such as a cogged belt or a plastic rod having a rack gear formed on at least one side thereof.

The contents of the original Japanese patent applications on which the Paris Convention priority claim is made for the present application are incorporated in this application by reference.

The invention claimed is:

1. A sunroof system for selectively closing an opening formed in a roof of a vehicle, comprising:
    a pair of side frames attached to the roof of the vehicle and extending on either side of the opening in a first direction;
    a cross frame made of molded plastic material and extending between the side frames;
    a slider slidably engaged by each side frame for sliding movement in the first direction and supporting a part of a closure member configured to close the opening formed in the roof;
    a push-pull cable formed with a driven gear along a length thereof and having one end connected to each slider;
    a drive gear rotatably supported by the cross frame and meshing with the driven gear of the push-pull cable;
    a drive pipe extending at least along a length of the cross frame and receiving a corresponding part of the push-pull cable therein;
    wherein the drive pipe is made of plastic material and the cross frame is provided with a pipe retaining feature therein, the pipe retaining feature comprising a pipe retaining groove formed along a length of the cross frame and a plurality of pairs of clips formed along the length of the cross frame and configured to resiliently engage the drive pipe in the pipe retaining groove, each pair of clips opposing each other and defining an open upper side and an open lower side for the pipe retaining groove while a remaining part of the pipe retaining groove at least partly comprises a bottom wall that supports the lower side of the drive pipe.

2. The sunroof system according to claim 1, wherein the cross frame comprises a main planar section formed by a wall extending substantially horizontally, and the pipe retaining groove is given with such a depth that at least part of the drive pipe retained in the pipe retaining groove overlaps with the horizontal wall of the main planar section.

3. The sunroof system according to claim 1, wherein the side frames extend in a fore-and-aft direction of a vehicle body, and the cross frame comprises a front frame extending along a front edge of the opening between front ends of the side frames.

4. The sunroof system according to claim 1, wherein the side frames extend in a fore-and-aft direction of a vehicle body, and the cross frame comprises a rear frame extending along a rear edge of the opening between rear ends or intermediate parts of the side frames.

* * * * *